US010427852B2

(12) United States Patent
Franca et al.

(10) Patent No.: US 10,427,852 B2
(45) Date of Patent: Oct. 1, 2019

(54) FLEXIBLE FITMENT FOR FLEXIBLE CONTAINER

(71) Applicant: Dow Global Technologies LLC, Midland, MI (US)

(72) Inventors: Marcos Franca, Sao Paulo (BR); Bruno Rufato Pereira, Sao Paulo (BR); Raimund Gerstner, Bucaramanga (CO)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/558,105

(22) PCT Filed: Mar. 15, 2016

(86) PCT No.: PCT/US2016/022453
§ 371 (c)(1),
(2) Date: Sep. 13, 2017

(87) PCT Pub. No.: WO2016/149259
PCT Pub. Date: Sep. 22, 2016

(65) Prior Publication Data
US 2018/0050854 A1  Feb. 22, 2018

Related U.S. Application Data

(60) Provisional application No. 62/134,247, filed on Mar. 17, 2015.

(51) Int. Cl.
*B65D 75/58* (2006.01)
*B29C 65/18* (2006.01)
(Continued)

(52) U.S. Cl.
CPC .......... *B65D 75/5883* (2013.01); *B29C 65/18* (2013.01); *B29C 66/14* (2013.01);
(Continued)

(58) Field of Classification Search
CPC .. B65D 75/5883; B65D 75/008; B29C 65/18; B29C 66/14; B29C 66/4326;
(Continued)

(56) References Cited

U.S. PATENT DOCUMENTS

| 4,732,299 A | 3/1988 | Hoyt |
| 5,220,949 A | 6/1993 | Rufenacht |
| 5,606,844 A * | 3/1997 | Takagaki ................ B29C 65/08 53/133.2 |
| 5,976,300 A * | 11/1999 | Buchanan ................. A61J 1/10 156/273.7 |

(Continued)

FOREIGN PATENT DOCUMENTS

| JP | 2000-153852 A | 6/2000 |
| JP | 2009-297910 A | 12/2009 |
| JP | 2011-231913 A | 11/2011 |

OTHER PUBLICATIONS

A. Dobrynin, J. Chem. Phys. 107 (21), Dec. 1, 1997, pp. 9234-9238.
(Continued)

*Primary Examiner* — Derek J Battisti
(74) *Attorney, Agent, or Firm* — Husch Blackwell LLP (57) ABSTRACT

The present disclosure provides a container. In an embodiment, a flexible container (8) is provided and includes a first multilayer film (16) and a second multilayer film (18). Each multilayer film includes a seal layer. The multilayer films are arranged such that seal layers oppose each other and the second multilayer film is superimposed on the first multilayer film. The films are sealed along a common peripheral edge (20). The flexible container includes a fitment (10) having a base (12). The base (12) includes an ethylene/a-olefin multi-block copolymer. The flexible container includes a fitment seal (22) comprising the base located between the multilayer films. The base is sealed to each multilayer film at a portion of the common peripheral edge (20).

17 Claims, 3 Drawing Sheets

(51) Int. Cl.
  *B29C 65/00* (2006.01)
  *B32B 1/02* (2006.01)
  *B32B 7/12* (2006.01)
  *B32B 27/08* (2006.01)
  *B32B 27/32* (2006.01)
  *B65D 75/00* (2006.01)
  *B29K 623/00* (2006.01)
  *B29L 31/00* (2006.01)

(52) U.S. Cl.
  CPC ........ *B29C 66/4326* (2013.01); *B29C 66/851* (2013.01); *B32B 1/02* (2013.01); *B32B 7/12* (2013.01); *B32B 27/08* (2013.01); *B32B 27/32* (2013.01); *B65D 75/008* (2013.01); *B29K 2623/065* (2013.01); *B29K 2623/0625* (2013.01); *B29K 2905/10* (2013.01); *B29K 2995/0063* (2013.01); *B29L 2031/712* (2013.01); *B32B 2250/242* (2013.01); *B32B 2255/10* (2013.01); *B32B 2255/26* (2013.01); *B32B 2307/72* (2013.01); *B32B 2439/40* (2013.01); *B65D 2575/586* (2013.01)

(58) Field of Classification Search
  CPC ......... B29C 66/851; B32B 1/02; B32B 27/08; B29K 2623/0625; B29K 2623/065
  See application file for complete search history.

(56) References Cited

U.S. PATENT DOCUMENTS

| | | | |
|---|---|---|---|
| 6,273,307 B1* | 8/2001 | Gross | B65D 75/5883 220/613 |
| 7,344,616 B2 | 3/2008 | Sorensen | |
| 7,355,089 B2 | 4/2008 | Chang et al. | |
| 7,608,668 B2 | 10/2009 | Li Pi Shan et al. | |
| 7,858,706 B2* | 12/2010 | Arriola | B32B 27/32 525/242 |
| 7,893,166 B2 | 2/2011 | Li Pi Shan et al. | |
| 7,947,793 B2* | 5/2011 | Marchand | C08F 297/083 359/586 |
| 2003/0029138 A1* | 2/2003 | Kobetsky | B29C 65/18 53/412 |
| 2005/0040181 A1* | 2/2005 | Kurosawa | B65D 75/5883 222/92 |
| 2008/0273820 A1* | 11/2008 | Wiker | B29D 7/01 383/103 |
| 2009/0139993 A1 | 6/2009 | Last | |
| 2014/0231452 A1* | 8/2014 | James | B65D 75/008 222/105 |

OTHER PUBLICATIONS

I. Potemkin et al., Physical Review E, vol. 57, No. 6, Jun. 1998, pp. 6902-6912.

* cited by examiner

FLEXIBLE FITMENT FOR FLEXIBLE CONTAINER

BACKGROUND

The present disclosure is directed to a flexible container having a flexible fitment.

Known are flexible pouches with rigid pour spouts for storage and delivery of flowable materials, often referred to as "pour-pouches." Many conventional pour-pouches utilize a rigid pour spout, with the base of the spout having winglets. Each winglet is a structure that is perpendicular to the base, each winglet extends radially away (in opposing directions) from the annular base of the spout. Winglets are used to increase the surface area of the annular base in order to promote adhesion between the spout and flexible packaging film.

Winglets, however, are problematic because they require a specialized heat seal bar to effectively seal the winglet to flexible film packaging. The specialized heat seal bar requires a unique shape that mates with the shape of the spout base and winglet. In addition, the heat seal process requires precise and mated alignment between the spout and the films to ensure the spout is in parallel alignment with the film orientation.

As such, the production of flexible pouches is replete with inefficiency due to (1) the expense of specialized heat seal equipment, (2) the production down-time for precise seal bar-winglet alignment, (3) the production down-time required for precise spout-film alignment, (4) the failure rate (leaks) due to misalignment, and (5) the quality control steps required at each stage of pour-pouch production.

The art recognizes the need for alternative processes in the production of pour-pouches. The art further recognizes the need for improved pour spouts that avoid the production drawbacks of spouts having winglets.

SUMMARY

The present disclosure provides a container. In an embodiment, a flexible container is provided and includes a first multilayer film and a second multilayer film. Each multilayer film includes a seal layer. The multilayer films are arranged such that seal layers oppose each other and the second multilayer film is superimposed on the first multilayer film. The films are sealed along a common peripheral edge. The flexible container includes a fitment having a base. The base includes an ethylene/α-olefin multi-block copolymer. The flexible container includes a fitment seal comprising the base located between the multilayer films. The base is sealed to each multilayer film at a portion of the common peripheral edge.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

Elastic recovery is measured as follows. Stress-strain behavior in uniaxial tension is measured using an Instron™ universal testing machine at 300% min$^{-1}$ deformation rate at 21° C. The 300% elastic recovery is determined from a loading followed by unloading cycle to 300% strain, using ASTM D 1708 microtensile specimens. Percent recovery for all experiments is calculated after the unloading cycle using the strain at which the load returned to the base line. The percent recovery is defined as:

$$\% \text{ Recovery} = 100*(E_f - E_s)/E_f$$

where $E_f$ is the strain taken for cyclic loading and $E_s$ is the strain where the load returns to the baseline after the unloading cycle.

An "ethylene-based polymer," as used herein is a polymer that contains more than 50 mole percent polymerized ethylene monomer (based on the total amount of polymerizable monomers) and, optionally, may contain at least one comonomer.

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Shore A hardness is measured in accordance with ASTM D 2240.

Tm or "melting point" as used herein (also referred to as a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

DETAILED DESCRIPTION

The present disclosure provides a flexible container. In an embodiment, the flexible container comprises a first multilayer film and a second multilayer film. Each multilayer film includes a seal layer. The multilayer films are arranged such that seal layers oppose each other and the second multilayer film is superimposed on the first multilayer film. The multilayer films are sealed along a common peripheral edge. The flexible container includes a fitment having a base. The base is formed from an ethylene/α-olefin multi-block copolymer. The flexible container includes a fitment seal comprising the base located between the multilayer films. The base is sealed to each multilayer film along a portion of the common peripheral edge.

1. Fitment

The present flexible container includes a first multilayer film and a second multilayer film and a fitment. In an embodiment, a flexible container 8 includes a fitment 10. The fitment 10 has a base 12, and a top 14 as shown in FIG. 1.

Figure 1:
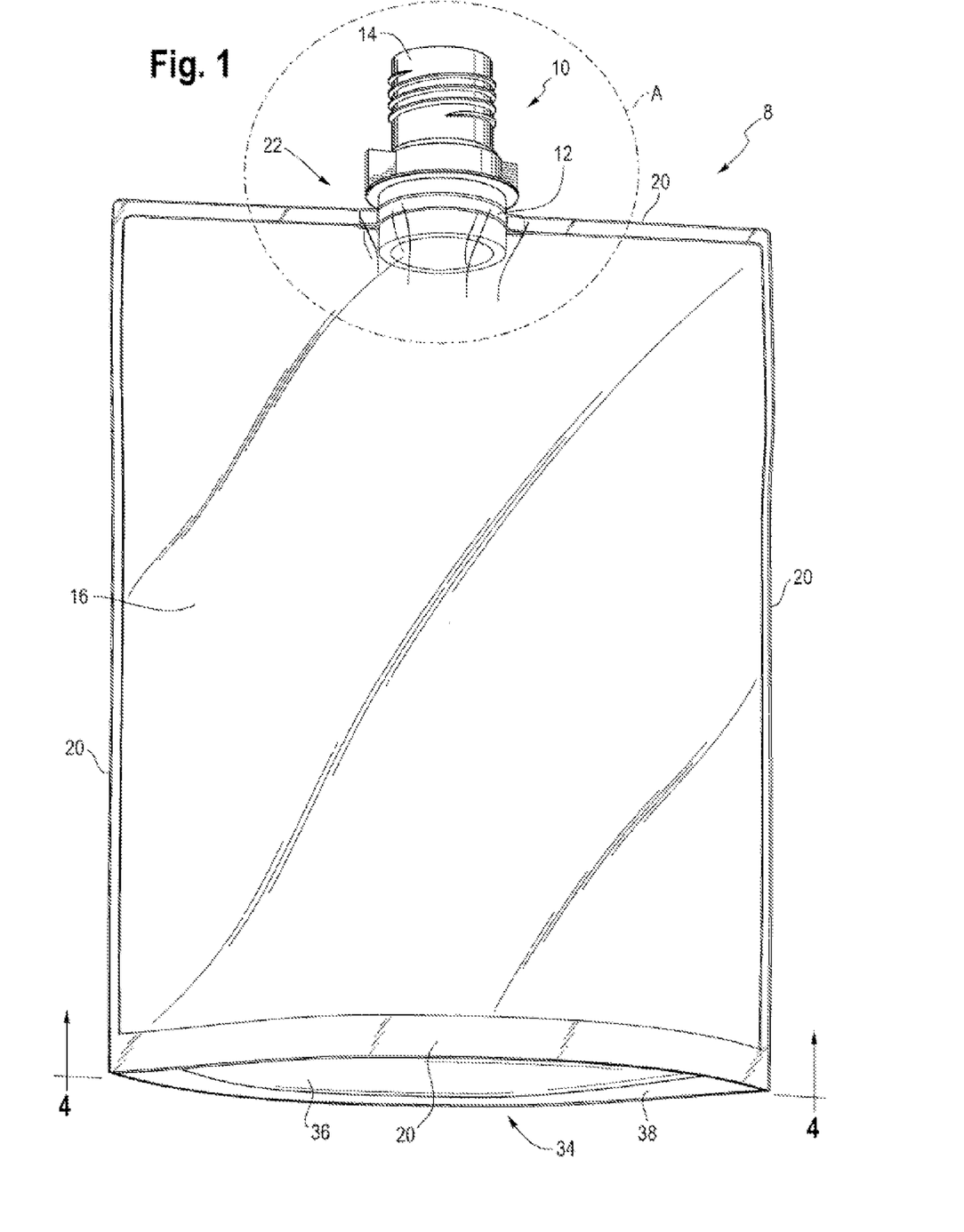
FIG. 1 is a perspective flexible container in accordance with an embodiment of the present disclosure.

The fitment 10 has a base 12 and a top 14 as shown in FIG. 1. The fitment 10 may be made from one or more (i.e., a blend) of polymeric materials. The base 12 contains, or is otherwise formed from, an ethylene/α-olefin multi-block copolymer. The base 12 may be made from a polymeric blend composed of the ethylene/α-olefin multi-block copolymer and one or more additional polymers. Alternatively, the base 12 is made solely from the ethylene/α-olefin multi-block copolymer. The top 14 may include suitable structure (such as threads, for example) for attachment with a closure.

In an embodiment, the base is only composed of, or is otherwise formed solely from, the ethylene/α-olefin multi-block copolymer.

In an embodiment the entire fitment 10 (the base 12 and the top 14) is only composed of, or is otherwise solely formed from, the ethylene/α-olefin multi-block copolymer.

Figure 3:
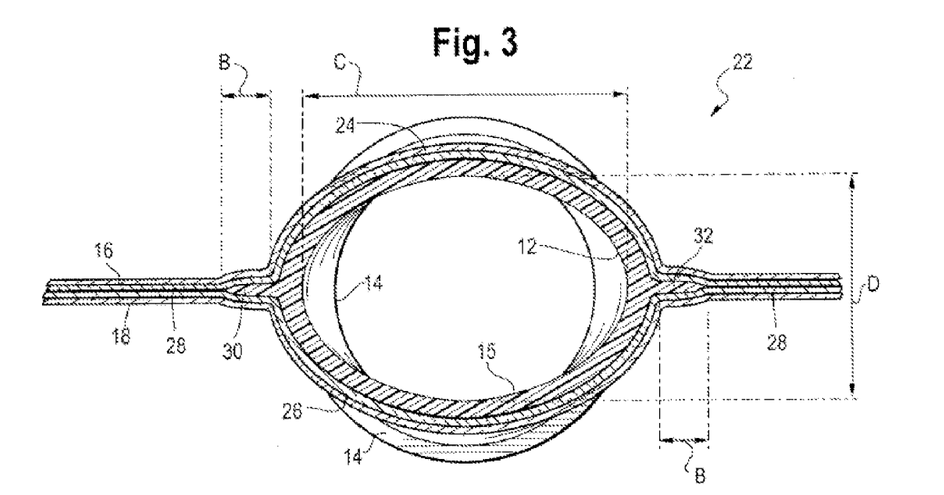
FIG. 3 is a sectional view of the pouch of FIG. 1 taken along line 3-3 of FIG. 2.

In an embodiment, the base has a wall 15, as shown in FIG. 3. The wall 15 has a thickness from 0.3 mm, or 0.4 mm, or 0.5 mm, or 0.6 mm, or 0.7 mm, or 0.8 mm, or 0.9 mm, or 1.0 mm to 1.2 mm, or 1.5 mm, or 1.7 mm, or 1.9 mm, or 2.0 mm. In a further embodiment, the wall 15 is solely composed of the ethylene/α-olefin multi-block copolymer and has the foregoing thickness.

The base 12 (and optionally the entire fitment 10) is formed from (wholly or partially) ethylene/α-olefin multi-block copolymer. The term "ethylene/α-olefin multi-block copolymer" and includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

Where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the ethylene/α- olefin multi-block copolymer may comprise 50 mol % to 90 mol % ethylene, or 60 mol % to 85 mol %, or 65 mol % to 80 mol %. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, or 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In an embodiment, the ethylene/α-olefin multi-block copolymer has hard segments and soft segments and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc;
and
Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer and has one, some, any combination of, or all the properties (i)-(ix) below:

(i) a melt temperature (Tm) from 80° C., or 85° C., or 90° C. to 95, or 99° C., or 100° C., or 105° C. to 110° C., or 115° C., or 120° C., or 125° C.;

(ii) a density from 0.86 g/cc, or 0.87 g/cc, or 0.88 g/cc to 0.89 g/cc;

(iii) 50-85 wt % soft segment and 40-15 wt % hard segment;

(iv) from 10 mol %, or 13 mol %, or 14 mol %, or 15 mol % to 16 mol %, or 17 mol %, or 18 mol %, or 19 mol %, or 20 mol % octene in the soft segment;

(v) from 0.5 mol %, or 1.0 mol %, or 2.0 mol %, or 3.0 mol % to 4.0 mol %, or 5 mol %, or 6 mol %, or 7 mol %, or 9 mol % octene in the hard segment;

(vi) a melt index (MI) from 1 g/10 min, or 2 g/10 min, or 5 g/10 min, or 7 g/10 min, to 10 g/10 min, or 15 g/10 min to 20 g/10 min;

(vii) a Shore A hardness from 65, or 70, or 71, or 72 to 73, or 74, or 75, or 77, or 79, of 80;

(viii) an elastic recovery (Re) from 50%, or 60% to 70%, or 80%, or 90%, at 300% 300% min$^{-1}$ deformation rate at 21° C. as measured in accordance with ASTM D 1708.

(ix) a polydisperse distribution of blocks and a polydisperse distribution of block sizes.

In an embodiment, the ethylene/α-olefin multi-block copolymer is an ethylene/octene multi-block copolymer.

The present ethylene/α-olefin multi-block copolymer may comprise two or more embodiments disclosed herein.

In an embodiment, the ethylene/octene multi-block copolymer is sold under the Tradename INFUSE™ is available from The Dow Chemical Company, Midland, Mich., USA. In a further embodiment, the ethylene/octene multi-block copolymer is INFUSE™ 9817.

In an embodiment, the ethylene/octene multi-block copolymer is INFUSE™ 9500.

In an embodiment, the ethylene/octene multi-block copolymer is INFUSE™ 9507.

The base 12 composed of the present ethylene/α-olefin multi-block copolymer with elastic recovery from 50% to 90% advantageously is flexible enough to be flat bar sealed without crazing, cracking or breaking and yet elastic enough to recoil, spring back, and open to an elliptical cross section shape post-flat seal.

2. Multilayer Films

The present flexible container includes a first multilayer film and a second multilayer film. In an embodiment, the flexible container 8 includes a first multilayer film 16 (a front film) and a second multilayer film 18 (a rear film) as shown in FIG. 1. The term 'first multilayer film' and the term "front film" are used interchangeably. The term "second multilayer film" and the term "rear film" are used interchangeably.

Figure 2:
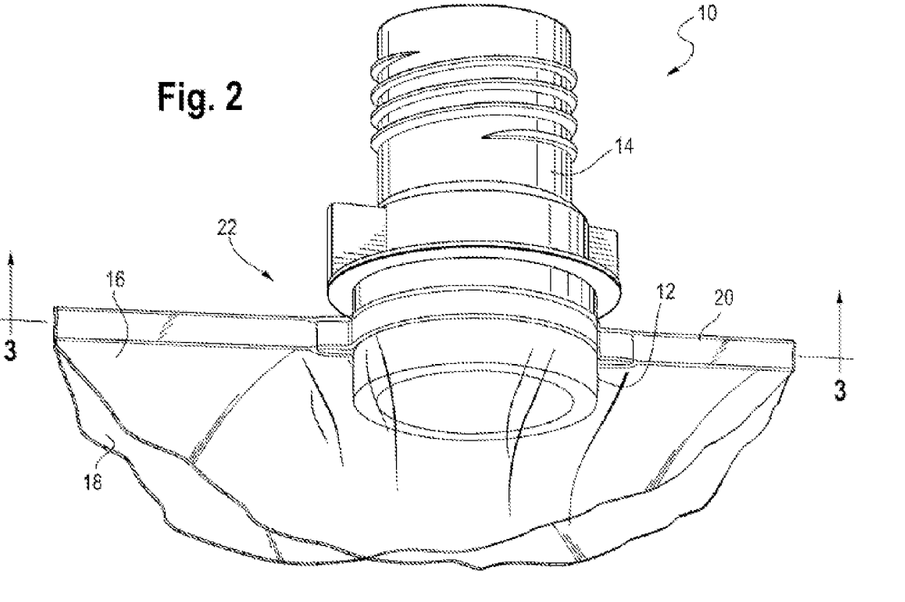
FIG. 2 is an enlarged view of area A of FIG. 1.

The process includes placing the fitment base between two opposing multilayer films. The base 12 is placed, or otherwise is positioned, between two opposing multilayer films, multilayer film 16 and multilayer film 18 as shown in FIG. 2. Each multilayer film has a respective seal layer containing an olefin-based polymer.

In an embodiment, each multilayer film is flexible and has at least two, or at least three layers. The flexible multilayer film is resilient, flexible, deformable, and pliable. The structure and composition for each multilayer film may be the same or different. For example, each of two opposing multilayer films can be made from a separate web, each web having a unique structure and/or unique composition, finish, or print. Alternatively, each multilayer film can be the same structure and the same composition.

In an embodiment, each multilayer film 16, 18 is a flexible multilayer film having the same structure and the same composition.

Each flexible multilayer film 16, 18 may be (i) a coextruded multilayer structure or (ii) a laminate, or (iii) a combination of (i) and (ii). In an embodiment, each flexible multilayer film 16, 18 has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

Nonlimiting examples of suitable polymeric materials for the seal layer include olefin-based polymer (including any ethylene/$C_3$-$C_{10}$ α-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE"), ethylene-acrylic acid or ethylene-methacrylic acid and their ionomers with zinc, sodium, lithium, potassium, magnesium salts, ethylene vinyl acetate copolymers and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VERSIFY™ or VISTAMAX™)), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™, blends thereof, and multilayer combinations thereof.

Nonlimiting examples of suitable polymeric materials for the tie layer include functionalized ethylene-based polymers such as ethylene-vinyl acetate ("EVA"), polymers with maleic anhydride-grafted to polyolefins such as any polyethylene, ethylene-copolymers, or polypropylene, and ethylene acrylate copolymers such an ethylene methyl acrylate ("EMA"), glycidyl containing ethylene copolymers, propylene and ethylene based olefin block copolymers (OBC) such as INTUNE™ (PP-OBC) and INFUSE™ (PE-OBC) both available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN™ resins available from The Dow Chemical Company); vinylethylene vinyl alcohol (EVOH), metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, ethylene vinyl acetate (EVA), ethylene ethyl acrylate (EEA), propylene-based plastomers or elastomers such as VERSIFY™ (The Dow Chemical Company), grafted olefin-based polymer (MAH-grafted), and blends thereof. An optional tie layer is selected from either ethylene-based olefin block copolymer PE-OBC (sold as INFUSE™) or propylene-based olefin block copolymer PP-OBC (sold as INTUNE™). The outer layer includes greater than 50 wt % of resin(s) having a melting point, Tm, that is from 25° C. to 30° C., or 40° C. or higher than the melting point of the polymer in the seal layer wherein the outer layer polymer is selected from resins such as AFFINITY™, LLDPE (DOWLEX™), VERSIFY™ or VISTAMAX, ELITE™, MDPE, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE'" (The Dow Chemical Company) for example, propylene-based plastomers or elastomers such as VERSIFY™ (The Dow Chemical Company), grafted olefin-based polymer (MAH-grafted), and blends thereof. The flexible multilayer film also includes an outer layer that is a polyamide.

In an embodiment, the flexible multilayer film is a coextruded and/or laminated film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm$^3$, or from 0.875 to 0.910 g/cm$^3$, or from 0.888 to 0.900 g/cm$^3$. The outer layer is composed of a material selected from LLDPE, OPET, OPP (oriented polypropylene), BOPP, polyamide, and combinations thereof.

In an embodiment, the flexible multilayer film is a coextruded and/or laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cm$^3$, or from 0.875 to 0.910 g/cm$^3$, or from 0.888 to 0.900 g/cm$^3$ and an outermost layer composed of a material selected from LLDPE, OPET, OPP (oriented polypropylene), BOPP, polyamide, and combinations thereof.

In an embodiment, the flexible multilayer film is a coextruded and/or laminated film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm$^3$, or from 0.875 to 0.910 g/cm$^3$, or from 0.888 to 0.900 g/cm$^3$. The outer layer is composed of a material selected from LLDPE, OPET, OPP (oriented polypropylene), BOPP, polyamide, and combinations thereof.

In an embodiment, the flexible multilayer film is a coextruded (or laminated) five layer film, or a coextruded (or laminated) seven layer film having at least two layers containing an ethylene-based polymer. The ethylene-based polymer may be the same or different in each layer.

In an embodiment, the flexible multilayer film is a coextruded and/or laminated five layer, or a coextruded (or laminated) seven layer film having at least one layer containing a material selected from LLDPE, OPET, OPP (oriented polypropylene), BOPP, and polyamide.

In an embodiment, the flexible multilayer film is a coextruded and/or laminated five layer, or a coextruded (or laminated) seven layer film having at least one layer containing OPET or OPP.

In an embodiment, the flexible multilayer film is a coextruded (or laminated) five layer, or a coextruded (or laminated) seven layer film having at least one layer containing polyamide.

In an embodiment, the flexible multilayer film is a seven-layer coextruded (or laminated) film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 106° C. The outer layer is a polyamide having a Tm from 170° C. to 270° C. The film has a ΔTm from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

3. Fitment Seal

The front film 16 and the rear film 18 are sealed around a common peripheral edge 20. The flexible container 8 includes a fitment seal 22 located along a portion of the peripheral edge 20. The fitment seal 22 includes the base 12 sandwiched between front film 16 and rear film 18, (ii) a weld 24 between the front film 16 and the base 12, (iii) a weld 26 between the rear film 18 and the base 12, (iv) a weld 28 between front film 16 and rear film 18, and (v) in situ winglet 30, and in situ winglet 32 extending from opposing sides of the base 12 as shown in FIG. 3.

The fitment seal 22 is formed by a two-stage heat seal process whereby opposing flat seal bars flat seal the film-base-film sandwich and opposing curved seal bars form and weld the in situ winglets 30, 32 as disclosed in copending case U.S. Application No. 61/134,269 point seal. Welds 24, 26, 28 are formed by way of a heat seal process which melts, or otherwise places in a flowable state, (i) a portion the olefin-based polymer in the seal layer of each respective film 16, 18 and (ii) a portion of the ethylene/α-olefin multi-block copolymer present in the base 12. In this way, weld 24 and weld 26 are composed of, or otherwise formed from, (i) the ethylene/α-olefin multi-block copolymer (from the base 12), (ii) the olefin-based polymer (from the seal layer), or (iii) a combination of (i) and (ii). Weld 28 is composed of, or otherwise formed from, the olefin-based polymers from the films 16, 18.

The in situ winglets 30, 32 are formed during the heat seal process which creates the fitment seal 22. An "in situ winglet," as used herein, is a structure that is an extension of the base 12, the in situ winglet being the polymeric solidification of a flowable caulk composed of the ethylene/α-olefin multi-block copolymer (from the base 12), the caulk created when the base is flattened under heat, the caulk solidified when joint gaps between the films and the base are subsequently pinched and closed, by way of point sealing as disclosed in application U.S. Ser. No. 62/134,269. The in situ winglets are composed of, or otherwise are formed from, (i) the ethylene/α-olefin multi-block copolymer (from the base 12), or (ii) a blend of the ethylene/α-olefin multi-block copolymer and the olefin-based polymer (from the seal layer).

In an embodiment, the fitment seal 22 is formed by way of a multiple step heat sealing process as disclosed in U.S. Ser. No. 62/134,269, the entire contents of which are incorporated by reference herein.

The heat and stress of flat bar sealing of fitment to film to make containers is limited. A fitment composed of low elasticity polyolefin (e.g., LDPE, HDPE) crushes, cracks, breaks, and is unusable. A fitment composed of a polyolefin elastomer (e.g., ENGAGE or VERSIFY elastomers) can exhibit deformation, yet does not recover adequately or welds shut. A fitment composed of a crosslinked elastomer (e.g., TPV) may fully recover but does not seal adequately and does not form a hermetic seal. Applicant surprisingly discovered that a fitment composed of the present ethylene/α-olefin multi-block copolymer recovers (recoils) will not seal to itself, and will seal the fitment to the film of the container using flat bar sealing.

In an embodiment, each in situ winglet has a length B (FIG. 3) from 0.5 mm, or 1.0 mm, or 2.0 mm, or 3.0 mm, or 4.0 mm, or 5.0 mm.

In an embodiment, the base 12 has a wall 15. The wall 15 has a thickness from 0.3 mm, or 0.4 mm, or 0.5 mm, or 0.6 mm, or 0.7 mm, or 0.8 mm, or 0.9 mm, or 1.0 mm to 1.2 mm, or 1.5 mm, or 1.7 mm, or 1.9 mm, or 2.0 mm.

In an embodiment, the base 12 has a cross-section having an elliptical shape. Nonlimiting examples of elliptical shape include circular, substantially circular, lenticular, and biconvex.

In an embodiment, the elliptical cross section has a major axis C and a minor axis D as shown in FIG. 3. The length ratio (in mm) of the major axis to the minor axis is from 4:1, or 3:1 or 2:1 to 1:1.

In an embodiment, the fitment seal 22 is a hermetic seal.

In an embodiment, the fitment seal 22 is a hard seal. A "hard seal," as used herein, is a heat seal that is not manually separable without destruction of the film. A hard seal is different than a frangible seal. A "frangible seal," as used herein, is a heat seal that is manually separable (or peelable) without destruction of the film. In general, a frangible seal is designed to be separable or openable with application of finger pressure or hand pressure to the seal. A hard seal is designed to remain intact with application of finger pressure or hand pressure to the seal.

4. Flexible Container

The present flexible container can be a box pouch, pillow pouch, spout k-sealed pouch, spout side gusseted pouch. The location of the fitment (spout or valve or other) installed into the container can be anywhere a seal exists between two films, i.e., on top, side or even on bottom in the seal of bottom gusset to front panel, for example. In other words, the fitment seal 22 can be located, or otherwise formed, on the flexible container anywhere where two films meet and are heat sealed together. Nonlimiting examples of suitable locations for the fitment seal 22 include top, bottom, side, corner, gusset areas of the flexible container.

The present flexible container can be formed with or without handles.

Figure 4:
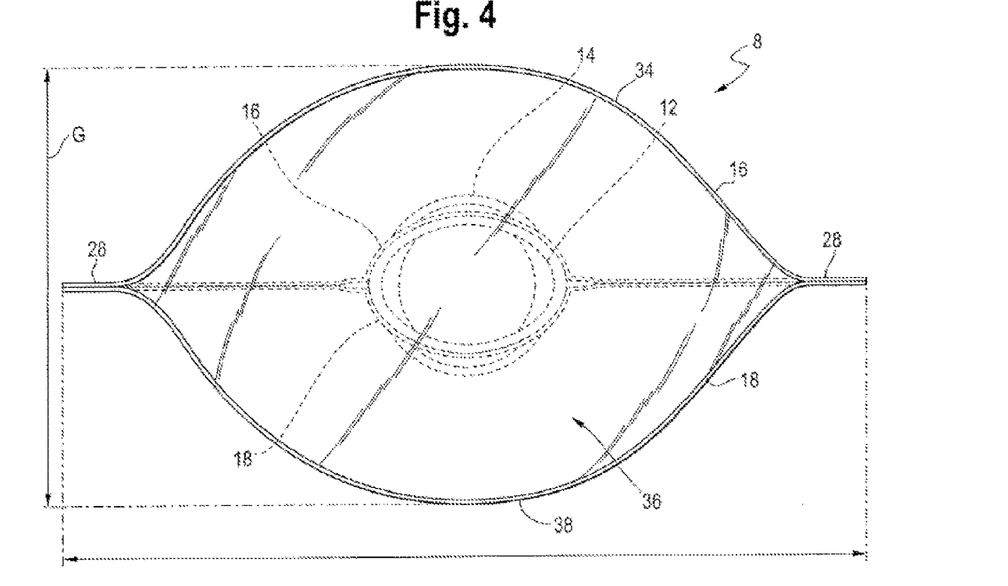
FIG. 4 is a bottom plan view of the flexible container of FIG. 1.
Figure 5:
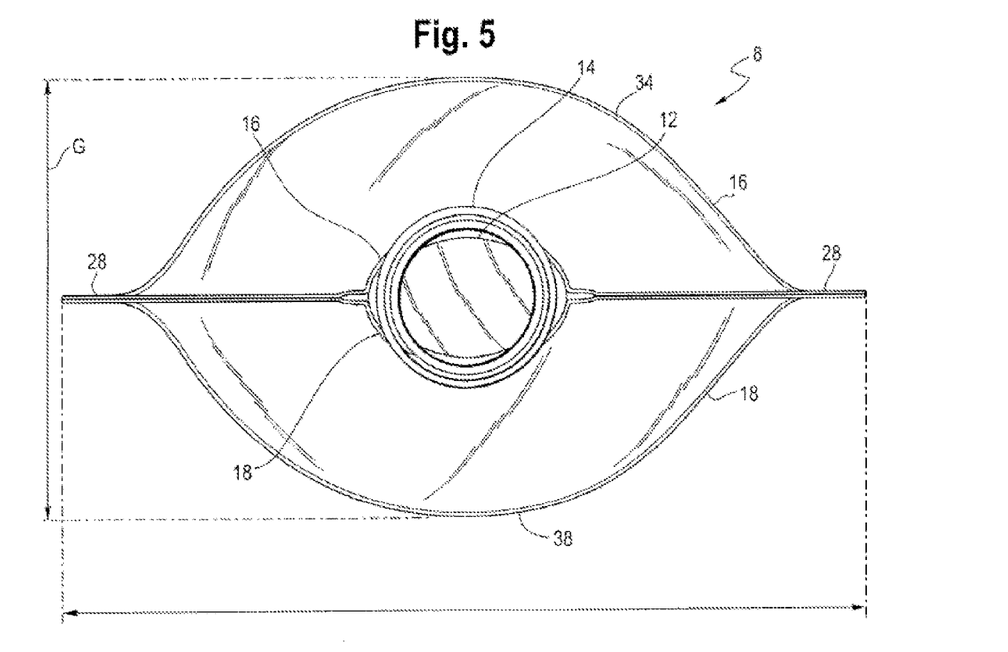
FIG. 5 is a top plan view of the flexible container of FIG. 1.

In an embodiment, the flexible container is a stand up pouch (SUP) as shown in FIGS. 1 and 4. The SUP includes a gusset 34. The gusset 34 is attached to, or otherwise extends from, a lower portion of the front film 16 and/or a lower portion of the rear film 18. The gusset 34 includes a gusset film 36 and a gusset rim 38. The gusset 34 may be formed by way of heat seal, weld (ultrasonic or high frequency or radio frequency), adhesive bond, and combinations thereof. The gusset 34, the films 16, 18, and the fitment seal 22 define a closed and hermetically sealed chamber for holding a flowable substance, such as liquid, for example.

The gusset 34 is made of a flexible polymeric material. In an embodiment, the gusset 34 is made from a multilayer film with the same structure and composition as the front film 16 and the rear film 18. The gusset 34 provides (1) the structural integrity to support the SUP and its contents without leakage, and (2) the stability for the SUP to stand upright (i.e., base on a support surface, such as a horizontal surface, or a substantially horizontal surface), without tipping over. In this sense, the pouch is a "stand-up" pouch.

In an embodiment, the gusset 34 is an extension of one or both films 16, 18. A folding procedure forms the gusset 34 from one, or both, of the films 16, 18.

The gusset rim 38 defines a footprint for the SUP. The footprint can have a variety of shapes. Nonlimiting examples of suitable shapes for the footprint include circle, square, rectangle, triangle, oval, ellipsoid, eye-shape, and teardrop. In a further embodiment, the shape of the footprint is ellipsoid.

In an embodiment, the flexible container includes a closure. Although FIGS. 1-2 show a screw-on type closure (for use with a mated screw-on cap), it is understood that the fitment 10 may embody other closure systems. Nonlimiting examples of suitable fitments and closures, include, screw cap, flip-top cap, snap cap, liquid or beverage dispensing fitments (stop-cock or thumb plunger), Colder fitment connector, tamper evident pour spout, vertical twist cap, horizontal twist cap, aseptic cap, vitop press, press tap, push on tap, lever cap, conro fitment connector, and other types of removable (and optionally reclosable) closures. The closure and/or fitment may or may not include a gasket.

In an embodiment, the flexible container 8 has a volume from 0.25 liters (L), or 0.5 L, or 0.75 L, or 1.0 L, or 1.5 L, or 2.5 L, or 3 L, or 3.5 L, or 4.0 L, or 4.5 L, or 5.0 L to 6.0 L, or 7.0 L, or 8.0 L, or 9.0 L, or 10.0 L, or 20 L, or 30 L.

In an embodiment, the present flexible container is made from 90 wt % to 100 wt % ethylene-based polymer—the films 16, 18 and gusset 34 being composed of flexible multiple layer film with layer materials selected from ethylene-based polymer such as LLDPE, LDPE, HDPE, and combinations thereof, and the fitment 10 composed of ethylene/α-olefin multi-block copolymer. Weight percent is based on total weight of the flexible container (without content). The flexible container made from 90 wt % to 100 wt % ethylene-based polymer is advantageous as it is readily recyclable.

The present flexible container is suitable for storage of flowable substances including, but not limited to, liquid comestibles (such as beverages), oil, paint, grease, chemicals, suspensions of solids in liquid, and solid particulate matter (powders, grains, granular solids). Nonlimiting examples of suitable liquids include liquid personal care products such as shampoo, conditioner, liquid soap, lotion, gel, cream, balm, and sunscreen. Other suitable liquids include household care/cleaning products and automotive care products. Other liquids include liquid food such as condiments (ketchup, mustard, mayonnaise) and baby food.

The present flexible container is suitable for storage of flowable substances with higher viscosity and requiring application of a squeezing force to the container in order to discharge. Nonlimiting examples of such squeezable and flowable substances include grease, butter, margarine, soap, shampoo, animal feed, sauces, and baby food.

By way of example, and not limitation, examples of the present disclosure are provided.

EXAMPLES

Flexible multilayer films with structures shown in Table 1 below are used in the present examples.

1. Multilayer Films

TABLE 1

Composition of the Flexible Multilayer Film (Film 1) Laminated Multilayer Film

| Material | Description | Density (g/cm$^3$) ASTM D792 | Melt Index (g/10 min) ASTM D1238 | Melting Point (° C.) DSC | Thickness (micrometer) |
|---|---|---|---|---|---|
| LLDPE | Dowlex ™ 2049 | 0.926 | 1 | 121 | 20 |
| HDPE | Elite ™ 5960G | 0.962 | 0.85 | 134 | 20 |
| LLDPE | Elite ™ 5400G | 0.916 | 1 | 123 | 19 |
| Adhesive Layer | Polyurethane solvent less adhesive (ex. Morfree 970/CR137) | | | | 2 |

TABLE 1-continued

Composition of the Flexible Multilayer Film (Film 1) Laminated Multilayer Film

| Material | Description | Density (g/cm$^3$) ASTM D792 | Melt Index (g/10 min) ASTM D1238 | Melting Point (° C.) DSC | Thickness (micrometer) |
|---|---|---|---|---|---|
| HDPE | Elite ™ 5960G | 0.962 | 0.85 | 134 | 19 |
| HDPE | Elite ™ 5960G | 0.962 | 0.85 | 134 | 20 |
| Seal Layer | Affinity ™ 1146 | 0.899 | 1 | 95 | 20 |
| | Total | | | | 120 |

2. Fitments

Six fitments, fitments 1-6, are provided. The dimensions of each fitment 1-6 are identical, with only the material varying across the fitments. Each fitment 1-6 has a base wall with a thickness of 0.8 mm and a base diameter of 12 mm.

The material and composition for fitments 1-6 are shown in Table 3.

3. Processing Conditions

Each fitment, fitment 1-6, is placed between two opposing films of Film 1 (from Table 1), with seal layers facing each other.

Each fitment-film configuration is subjected to a two-step sealing process (flat seal then pinch seal) with conditions below.

TABLE 2

Processing Conditions for Installing the Fitments

Flat Seal process conditions

Equipment: Sommer Automatic Sealer GP 260
Description: Opposing flat seal bars with independent temperature control and force distribution.
Seal force: 800N
Heat seal bar dimensions: width: 12.5 mm
(upper and lower) length: 120 mm
Heat seal bar material: Brass with Teflon tape
Air Pressure: 6 Bars
Upper seal bar temperature: 180° C. +/− 8° C.
Lower seal bar temperature: 180° C. +/− 8° C.
Seal time: 0.75 seconds
Equipment: pneumatic clamp with semi-circular opening for the spout
Description: opposing curved aluminum seal bars**

TABLE 2-continued

Processing Conditions for Installing the Fitments

Point seal process conditions

Seal force: 800N
Heat seal bar dimensions: width: 12.5 mm
(upper and lower) length: 120 mm
Heat seal bar material: Aluminum with Teflon tape
Air Pressure: 6 Bars
Upper curved seal bar temperature: Ambient temperature (22° C.)
Lower curved seal bar temperature: Ambient temperature (22° C.)
Seal time: 1 second

**Heat dissipation occurs by convection by naturally circulating air around the curved aluminum bars. Optionally, the curved aluminum bars can be cooled by circulating compressed air or another coolant fluid through internal channels made in the aluminum bar.

Results of the tests with different fitments, fitments 1-6, using opposing films of Film 1 are described in Table 3 below.

TABLE 3

| | Material | Description | Density (g/cm$^3$) | MI (g/10 min) | Elastic Recovery+ (%) | Tm (° C.) DSC | Result |
|---|---|---|---|---|---|---|---|
| 1 | Infuse ™ 9817 | Ethylene/octene Multi-block copolymer | 0.877 | 15 | 60-70 | 120 | Spout tube is open, proper seal with no leakage. |
| 2 | Infuse ™ 9500 | Ethylene/octene Multi-block copolymer | 0.877 | 5 | 60-70 | 122 | Spout tube is open, proper seal with no leakage. |
| 3 | Infuse ™ 9507 | Ethylene/octene Multi-block copolymer | 0.866 | 5 | 60-70 | 119 | Spout tube is open, proper seal with no leakage. |
| 4 | Engage ™ 8200 | Ethylene-Octene Random Copolymer | 0.870 | 5 | 0-20 | 63 | Total collapse of the spout sealing the opening |
| 5 | DMDA 8920 | High density Polyethylene | 0.956 | 18 | <1 | 130 | Improper seal of edges, severe leakage |
| 6 | Versify ™ 4301 | Propylene Ethylene Random Copolymer | 0.870 | 25* | 0-20 | NA | Improper seal of edges, severe leakage |

*MFR @ 2.16 Kg, 230° C.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A flexible container comprising:
a first multilayer film and a second multilayer film, each multilayer film comprising a seal layer, the multilayer films arranged such that seal layers oppose each other and the second multilayer film is superimposed on the first multilayer film, the films sealed along a common peripheral edge;
a fitment comprising a base, the base comprising an ethylene/α-olefin multi-block copolymer consisting of an ethylene monomer and a $C_3$-$C_{20}$ α-olefin comonomer, the ethylene/α-olefin multi-block copolymer having an elastic recovery from 50% to 90% as measured in accordance with ASTM D 1708 (300% min$^{-1}$ deformation rate at 21° C.); and
a fitment seal comprising the base located between the multilayer films and the base is sealed to each multilayer film at a portion of the common peripheral edge.

2. The flexible container of claim 1 wherein the ethylene/α-olefin multi-block copolymer has a melt temperature from 115° C. to 125° C.

3. The flexible container of claim 1, wherein the ethylene/α-olefin multi-block copolymer has a melt temperature, Tm1, from 115° C. to 125° C. and each seal layer comprises an olefin-based polymer having melt temperature, Tm2, and Tm2 is from 10° C. to 40° C. less than Tm1.

4. The flexible container of claim 3 wherein the olefin-based polymer of the seal layer is selected from the group consisting of ethylene-based polymer and propylene-based polymer.

5. The flexible container of claim 1 wherein the base has a wall thickness from 0.5 mm to 2.0 mm.

6. The flexible container of claim 1 wherein the base has an elliptical cross-section.

7. The flexible container of claim 6 wherein the elliptical cross section has a major axis and a minor axis, and the length ratio (in mm) of the major axis to the minor axis is from 4:1 to 1:1.

8. The flexible container of claim 1 wherein the base comprises in situ formed winglets.

9. The flexible container of claim 1 wherein the fitment comprises a top extending from the base, the base and the top comprising the ethylene/α-olefin multi-block copolymer.

10. The flexible container of claim 1 wherein the fitment seal is a hard seal.

11. The flexible container of claim 1 wherein the fitment seal is hermetic seal.

12. The flexible container of claim 1 comprising a gusset sealed to the first multilayer film and the second multilayer film.

13. The flexible container of claim 12 wherein the flexible container is a stand-up pouch.

14. The flexible container of claim 1 wherein the fitment comprises a closure.

15. The flexible container of claim 1 wherein the ethylene/α-olefin multi-block copolymer consists of (i) ethylene and (ii) straight-chain or branched $C_3$-$C_{20}$ α-olefin comonomer.

16. The flexible container of claim 15 wherein the ethylene/α-olefin multi-block copolymer consists of (i) ethylene and (ii) a comonomer selected from the group consisting of butene, hexene, and octene.

17. The flexible container of claim 1 wherein the ethylene/α-olefin multi-block copolymer consists of (i) ethylene and (ii) octene.

* * * * *